May 5, 1942.    H. TUNICK    2,282,105
DETECTION OF FREQUENCY MODULATED WAVES
Filed Dec. 5, 1941    2 Sheets-Sheet 1

INVENTOR
HARRY TUNICK
BY H.S.Grover
ATTORNEY

May 5, 1942.                H. TUNICK                 2,282,105
                  DETECTION OF FREQUENCY MODULATED WAVES
                    Filed Dec. 5, 1941          2 Sheets-Sheet 2

INVENTOR
*HARRY TUNICK*
BY *H.S.Grover*
ATTORNEY

Patented May 5, 1942

2,282,105

UNITED STATES PATENT OFFICE 2,282,105

DETECTION OF FREQUENCY MODULATED WAVES

Harry Tunick, Rye, N. Y., assignor to Radio Corporation of America, a corporation of Delaware Original application October 16, 1940, Serial No. 361,413. Divided and this application December 5, 1941, Serial No. 421,729

3 Claims. (Cl. 250—27)

This is a division of my copending application Serial No. 361,413, filed October 16, 1940. Figures 1 to 6 herein are, respectively, Figures 21 to 26 of my application Serial No. 361,413.

The object of my present invention is to provide improved circuits for converting frequency modulated waves into waves of varying amplitude and for rectifying or detecting such waves of varying amplitude. Figures 1 to 6 inclusive herein are wiring diagrams of various circuits containing the improvements of my present invention wherein frequency modulated waves are converted and detected for translation into the original transmitted signal.

Figure 1:
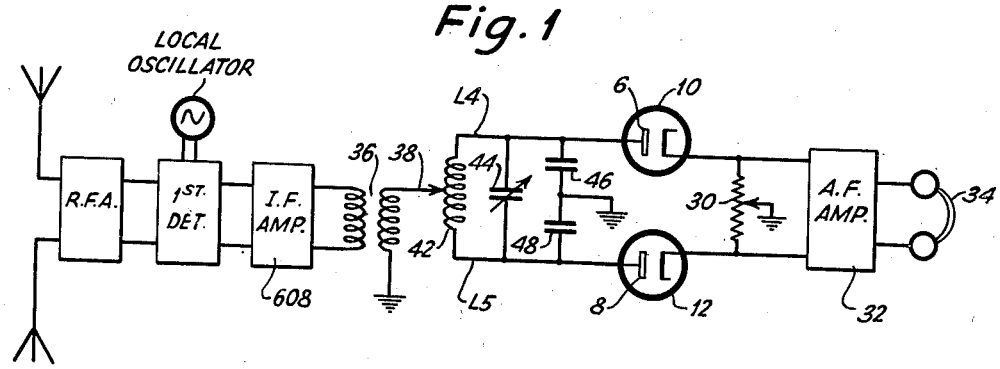

Referring to Figure 1, frequency modulated waves picked up by the antenna are amplified by the radio frequency amplifier RFA. The amplified waves are fed to the first detector which is also supplied with waves from a local oscillator, as illustrated. The intermediate or beat frequency waves produced by the first detector are then fed to and amplified by intermediate frequency amplifier 608.

These intermediate frequency, frequency modulated waves are fed through transformer 36 and impressed through lead 38 on the mid-point 40 of inductor 42 tuned by shunt condenser 44. These waves are then impressed on the plates 6, 8 of detectors 10, 12 whose cathodes are connected as shown to the modulation frequency amplifier 32. Plate 6 is connected to ground by means of a condenser 46 and plate 8 is connected to ground by means of condenser 48. Condenser 48 is larger than condenser 46 so that the detector tubes 10, 12 are unbalanced with respect to ground.

Figure 2:
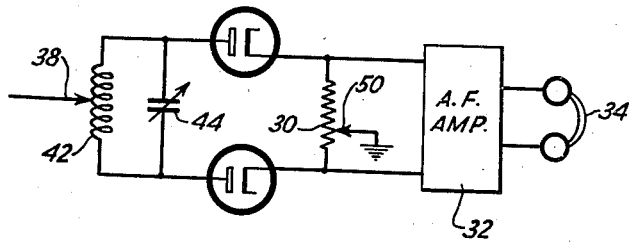

Figure 2 is similar to Figures 1 with the exception that condensers 46, 48 are omitted, but in this case while 38 is tapped to the center point of coil 42, the grounding connection 50 for the output resistor 30 is off center, thereby unbalancing the detectors.

Figure 3:
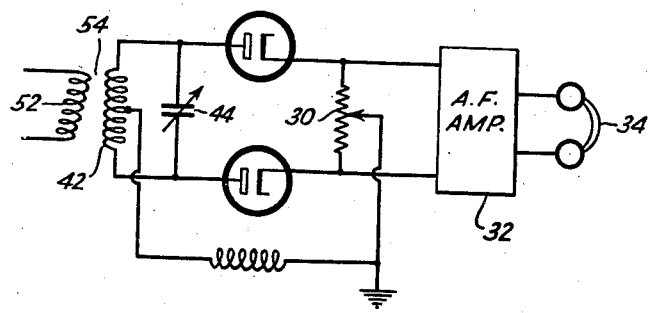

In the system of Figure 3, frequency modulated waves, preferably of intermediate frequency, are fed into the primary 52 which is inductively coupled to the secondary 42. One end, preferably the upper end of coil 52, is arranged so as to be close to coil 42, thereby effecting capacity coupling at point 54. As before, the output is taken from resistor 30 and fed to amplifier 32 and then into a loudspeaker, translating device or earphones 34.

Figure 4:
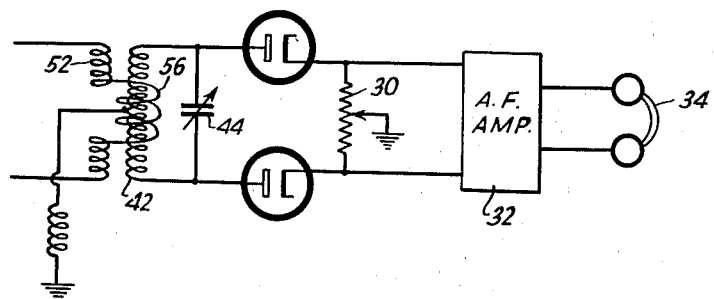

Figure 4 is similar to Figure 3 except that the primary 52 is sectionalized with a mid-section 56 highly capacitively coupled to the secondary 42 at the mid-portion of coil 42.

Figure 5:
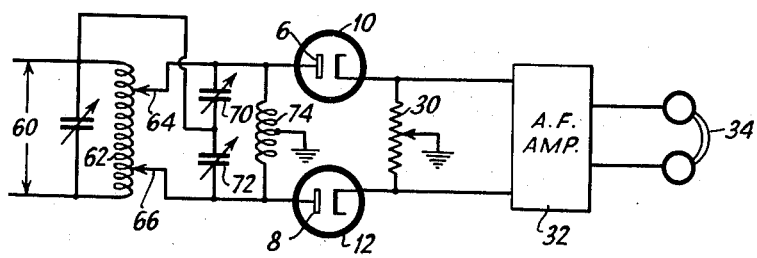

In the frequency modulation detector system of Figure 5, intermediate frequency, frequency modulated waves are impressed across leads 60, causing frequency modulated currents to flow in coil 62. Leads 64, 66 are tapped to coil 62 and impress the frequency modulated waves upon the plates 6, 8 of detector tubes 10, 12. This coupling excites the plates in phase opposition with waves from leads 60. The plates 6, 8 are also excited cophasally by lead 68, connected as shown to one end of coil 62 and between condensers 70, 72 acting as by-pass condensers. A choke coil 74 may be provided if desired with an intermediate point grounded as shown. The detected wave output of modulation frequency is amplified in amplifier 32 and fed to earphones 34 or, preferably, to a loudspeaker. The audio frequency or modulation potentials are taken from the cathodes of the detector tubes 10, 12, which cathodes are connected across the output resistor 30, an intermediate point of which is grounded as shown.

Figure 6:
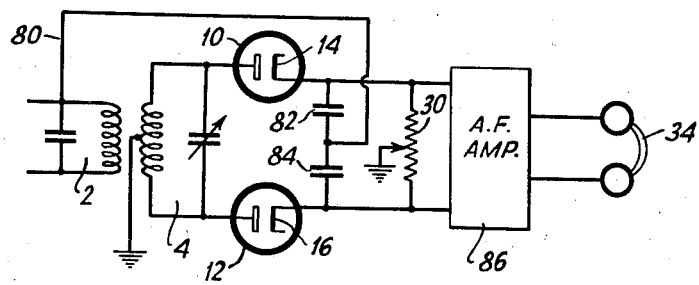

In the modification shown in Figure 6, intermediate frequency, frequency modulated waves are fed in phase opposition to the plates of the detector tubes 10, 12 through tuned circuits 2, 4. The cathodes 14, 16 are excited cophasally by means of the connection 80 which is connected to the upper end of tuned circuit 2 and between condensers 82, 84. Condensers 82, 84 are connected, as shown, between the cathodes 14, 16 and act as by-pass condensers. The audio frequency output is taken from the audio frequency amplifier 86 and fed into earphones 34 or, if desired, the output from amplifier 86 may be used in loudspeakers or the like. To complete the detector direct current circuit a resistor 30 is provided with its mid-point grounded.

In such systems as shown in Figure 1, the plates 6, 8 are subjected to cophasal voltage excitation from tap 38 through leads L₄, L₅. Simultaneously, by virtue of circulating currents set up in the tuned circuit 42, 44, the anodes 6, 8 are subjected to voltages which are in phase opposition. These excitations, namely, the cophasal and the phase opposition excitations, of the detector elements produce a resultant which varies in amplitude according to the transmitted signal. This variable amplitude resultant is susceptible to detector action so that the transmitted signal is reproduced in the subsequent amplifiers for utilization in translating devices such as 34, illustrated in Figure 1.

All of the detector systems herein described may be employed for the reception of phase modulated waves. In this event, the audio modulating system should have a characteristic such that its output falls off with increase in modulation frequency. Preferably, this falling off should be such that the output of the audio amplifier varies inversely with the audio or modulation frequency. The detecting systems are not limited to the reception of voice modulated waves, but may be employed for the reception of other types of signals, such as facsimile, television, code, etc. wherein the carrier wave has been angular velocity or frequency modulated by the signal. Where the frequency modulation is large in extent, the various circuits may be broadened by the series or parallel insertion of resistors so that the detecting system accommodates the total frequency swing of the received waves or twice the highest modulation frequency, whichever is greater.

Having thus described my invention, what I claim is:

1. A detecting system for angular velocity modulated waves comprising a parallel tuned circuit, a pair of rectifiers having their input electrodes connected to opposite terminals of said parallel tuned circuit, a circuit connecting the output electrodes of said rectifiers in opposition, said parallel tuned circuit consisting of a coil and a condenser connected in parallel, and an input coil for feeding angular velocity modulated waves to said parallel tuned circuit, said input coil being arranged so as to inductively transfer energy into said parallel tuned circuit and also to transfer energy capacitively into said parallel tuned circuit by virtue of the arrangement of said coils whereby said coils at certain portions thereof are in closer proximity to each other than at other portions thereof.

2. A converting arrangement for angular velocity modulated waves comprising a tuned coil, a pair of rectifiers connected to points of opposite instantaneous polarity on said coil, a demodulation circuit connected between the output electrodes of said rectifiers, and an input coil inductively coupled to said tuned coil, said input coil being so arranged that certain portions thereof are capacitively, as well as inductively, coupled to said tuned coil, said capacitively coupled portions being in closer physical relationship to said tuned coil than the remaining portions of said input coil.

3. Apparatus as claimed in the preceding claim, characterized by the fact that the portions at one end of said input coil are more closely capacitively coupled by virtue of their physical relationship to said tuned coil than the remaining portions of said input coil.

HARRY TUNICK.